United States Patent
Pignier et al.

(10) Patent No.: US 10,978,879 B2
(45) Date of Patent: Apr. 13, 2021

(54) ELECTRICAL ENERGY MANAGEMENT OF EXCHANGES BETWEEN A PLURALITY OF RESIDENTIAL NETWORKS

(71) Applicant: ELECTRICITE DE FRANCE, Paris (FR)

(72) Inventors: Daniel Pignier, L'Hay les Roses (FR); David Menga, Verrieres-le-Buisson (FR)

(73) Assignee: ELECTRICITE DE FRANCE, Paris (FR)

(*) Notice: Subject to any disclaimer, the term of this patent is extended or adjusted under 35 U.S.C. 154(b) by 0 days.

(21) Appl. No.: 16/471,171

(22) PCT Filed: Dec. 19, 2017

(86) PCT No.: PCT/EP2017/083575
§ 371 (c)(1),
(2) Date: Jun. 19, 2019

(87) PCT Pub. No.: WO2018/114968
PCT Pub. Date: Jun. 28, 2018

(65) Prior Publication Data
US 2019/0312440 A1  Oct. 10, 2019

(30) Foreign Application Priority Data
Dec. 19, 2016 (FR) .................................. 16 62728

(51) Int. Cl.
G05B 99/00 (2006.01)
H02J 3/46 (2006.01)
G05B 13/04 (2006.01)
H02J 3/00 (2006.01)
H02J 4/00 (2006.01)
(Continued)

(52) U.S. Cl.
CPC .............. *H02J 3/46* (2013.01); *G05B 13/048* (2013.01); *H02J 3/008* (2013.01); *H02J 3/06* (2013.01);
(Continued)

(58) Field of Classification Search
CPC .................... H02J 3210/14; H02J 2310/14
(Continued)

(56) References Cited

U.S. PATENT DOCUMENTS

2008/0319893 A1* 12/2008 Mashinsky ...... G06Q 10/06313
705/37
2010/0112933 A1* 5/2010 Mueller ............. H04B 7/18506
455/1
(Continued)

FOREIGN PATENT DOCUMENTS

EP  2 339 714 A2  6/2011
EP  2 650 651 A1  10/2013
(Continued)

OTHER PUBLICATIONS

Xiao et al, Prospect Theoretic Analysis of Energy Exchange Among Microgrids, 2014, IEEE, pp. 10 (Year: 2014).*

*Primary Examiner* — Suresh Suryawanshi
(74) *Attorney, Agent, or Firm* — Faegre Drinker Biddle & Reath LLP (57) ABSTRACT

A method for exchanging electrical energy between a plurality of private electricity networks each comprising: a coordination unit, groups of electrical devices, and a plurality of relays arranged on the power supply lines of the devices. The method comprises: a) transmitting device status data from the devices to the coordination unit, b) establishing a set of electrical energy resources and requirements, c) comparing the set of resources and requirements with those of other private networks, d) allocating the requirements and resources to one another, e) ensuring at least part of the routing of electrical energy by means of digital certificates and instructions for drawing electrical energy that are sent to the relays, f) keeping record of each energy exchange in order to define a transaction between two private networks.

16 Claims, 5 Drawing Sheets

(51) Int. Cl.
   *H02J 13/00* (2006.01)
   *H02J 3/14* (2006.01)
   *H02J 3/06* (2006.01)

(52) U.S. Cl.
   CPC ............ *H02J 3/14* (2013.01); *H02J 4/00* (2013.01); *H02J 13/00* (2013.01); *H02J 3/003* (2020.01); *H02J 2203/20* (2020.01); *H02J 2310/64* (2020.01); *Y02B 70/3225* (2013.01); *Y04S 20/222* (2013.01); *Y04S 50/10* (2013.01)

(58) Field of Classification Search
   USPC .......................................................... 700/291
   See application file for complete search history.

(56) References Cited

U.S. PATENT DOCUMENTS

| | | | | |
|---|---|---|---|---|
| 2010/0274407 | A1* | 10/2010 | Creed | H02J 4/00 700/295 |
| 2010/0306097 | A1 | 12/2010 | Greiner et al. | |
| 2011/0055036 | A1 | 3/2011 | Helfan | |
| 2011/0196547 | A1 | 8/2011 | Park et al. | |
| 2013/0099581 | A1* | 4/2013 | Zhou | H02J 7/34 307/82 |
| 2013/0253973 | A1* | 9/2013 | Ishibashi | G06Q 10/06314 705/7.24 |
| 2015/0263519 | A1* | 9/2015 | Suzuki | H02J 3/0073 700/297 |
| 2016/0134110 | A1* | 5/2016 | Waki | G06Q 10/06 700/287 |

FOREIGN PATENT DOCUMENTS

| | | |
|---|---|---|
| EP | 2 650 840 A1 | 10/2013 |
| FR | 2 936 662 A1 | 4/2010 |
| FR | 2 936 663 A1 | 4/2010 |
| FR | 2 958 812 A1 | 10/2011 |
| JP | 2004-015882 | 1/2004 |
| WO | 2014/147437 A1 | 9/2014 |

* cited by examiner

ELECTRICAL ENERGY MANAGEMENT OF EXCHANGES BETWEEN A PLURALITY OF RESIDENTIAL NETWORKS

CROSS-REFERENCE TO RELATED APPLICATIONS

This application is the U.S. national phase of the International Patent Application No. PCT/EP2017/083575 filed Dec. 19, 2017, which claims the benefit of French Application No. 16 62728 filed Dec. 19, 2016, the entire content of which is incorporated herein by reference.

FIELD

The disclosure falls under the field of electrical energy management, and in particular the management of exchanges between a plurality of residential networks.

BACKGROUND

At the electricity distribution network scale, it is known to ensure the routing of energy from the energy sources to the point of delivery and consumption, typically the general entry point to each residential electricity network. The main purpose of such routing is to ensure the most stable and continuous supply possible while avoiding local overloads that could damage equipment. Traditionally, the management of electrical energy distribution consists of adapting the network itself so that each demand for energy is fulfilled in real time.

Recently, electricity distribution management systems have been designed to act on the actual demand, for example according to the principle of "distributed load shedding": energy consumers allow their energy requirements to be staggered over time in order to achieve uniformity in the total demand over time.

The electric power-consuming entities and electric power-generating entities have no direct relationship, whether commercial or technical. At least one intermediary entity provides the link. From a commercial point of view, the intermediary entity purchases energy from the generating entities and sells energy to each of the consuming entities. From a technical point of view, the electricity generated is injected into the grid while the energy consumed is drawn from the grid. Quantitative measures help to ensure a balance, but traceability is impossible. Unlike many common consumer goods, the end consumer has no technical means for choosing, or even for finding out, the source of the electricity that he consumes. For example, a consumer cannot directly give preference to consuming one electricity producer over another, for example according to his ecological convictions.

The electrical structures for the generation, distribution and use of energy, especially for the home, do not allow reducing the multiple losses during energy conversion. The structures for energy transport, at both the neighborhood and home network scale, operate essentially if not exclusively in alternating current, even though the portion of the hardware that operates using direct current is tending to increase. However, the physical installations (cabling) are compatible with both alternating currents and direct currents. Existing systems do not allow both using the energy directly and ensuring it is safe and secure according to priorities, characteristics of the energy, availability, and traceability, at a low cost.

No local intelligence device is able to take into account all of these parameters in order to provide the energy required at the right time and at the best possible cost for any given hardware during a fixed period. No device allows negotiating the necessary energy for each end use, much less directly peer-to-peer with traceability of its origin.

The disclosure improves the situation.

SUMMARY

The applicant proposes a method for exchanging electrical energy between a plurality of private electricity networks connected to each other via at least one general electricity distribution network. Each private network comprises:
  a coordination unit coupled to a respective node located at the interface of the general network and the private network,
  functional groups of at least one electrical device, each group being connected to the node via a corresponding line of the private network, and
  a plurality of relays, each relay being arranged on a line.
For each private network, the method comprises:
a) transmitting, from each of the relays to the coordination unit, status data for the devices of the corresponding group,
b) establishing a set of electrical energy resources and requirements internal to the private network, based on the status data,
c) comparing the set of internal resources and requirements with each other and with the external resources and requirements of the other private networks,
d) allocating an internal or external resource to each internal requirement, and an internal or external requirement to each internal resource, according to the results of the comparison,
e) ensuring at least part of the routing of electrical energy according to the allocations, this ensuring of the routing comprising:
  e1) issuing a digital certificate for each internal resource injected into the general network,
  e2) identifying the source of the external resources drawn via the general network, by means of digital certificates, and
  e3) transmitting instructions for drawing electrical energy on the private network, to the relays,
f) keeping record of each energy exchange in order to define a transaction between two private networks.

Such a method allows each user of a private network, for example a residential network, to coordinate his energy resources and requirements for each use with the energy resources and requirements of other private networks. Each user can automatically acquire energy packets by applying preselected and highly adaptable selection criteria, comprising pricing criteria as well as technical and ecological criteria. Such a method also makes it easier to comply with future regulations, particularly in France, aiming at a zero or negative average consumption of buildings or a group of buildings, for example at the neighborhood scale. These are referred to as positive energy building(s). This method is also compatible with a neighborhood-wide energy exchange platform and/or a low voltage transformer station (LV) and/or an outgoing line from an LV station.

According to other aspects, the applicant proposes a system capable of implementing the method, a kit for installing such a system, as well as a computer program for implementing the system and a non-transitory computer-readable storage medium on which the program is stored.

BRIEF DESCRIPTION OF THE DRAWINGS

Other features, details, and advantages of the disclosure will be apparent from reading the detailed description below, and from an analysis of the appended drawings, in which.

DETAILED DESCRIPTION

The drawings and description below contain, for the most part, elements that are certain in nature. They can therefore not only serve to provide a better understanding of the disclosure, but they also contribute to its definition where applicable.

In the following, the term "electrical device" indiscriminately denotes devices that consume electrical energy, devices that generate electrical energy, and devices that store electrical energy which can alternately consume and supply electrical energy.

Figure 1:
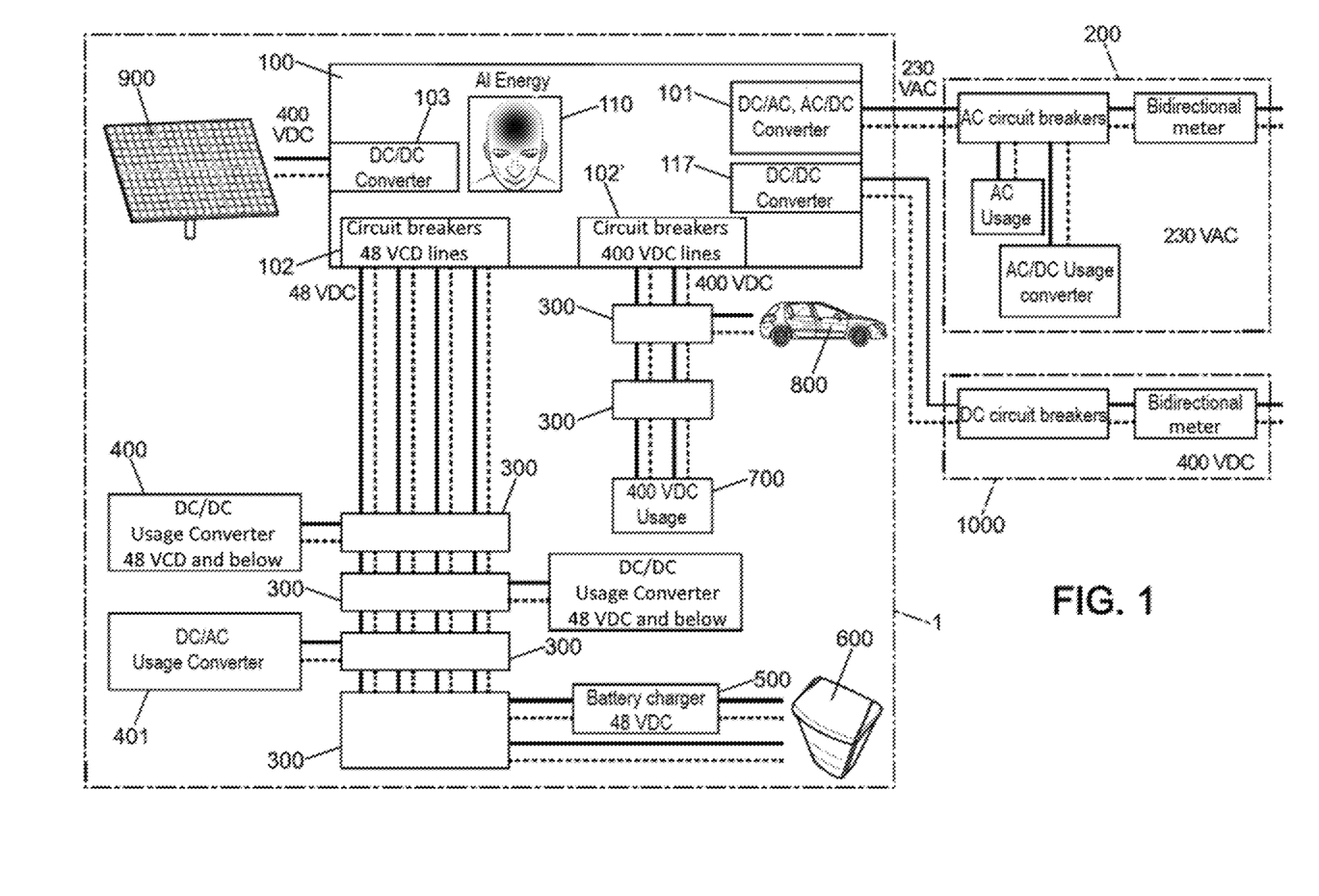
FIG. 1 shows a diagram of a set of elements organized in a structure according to an embodiment.
Figure 2:
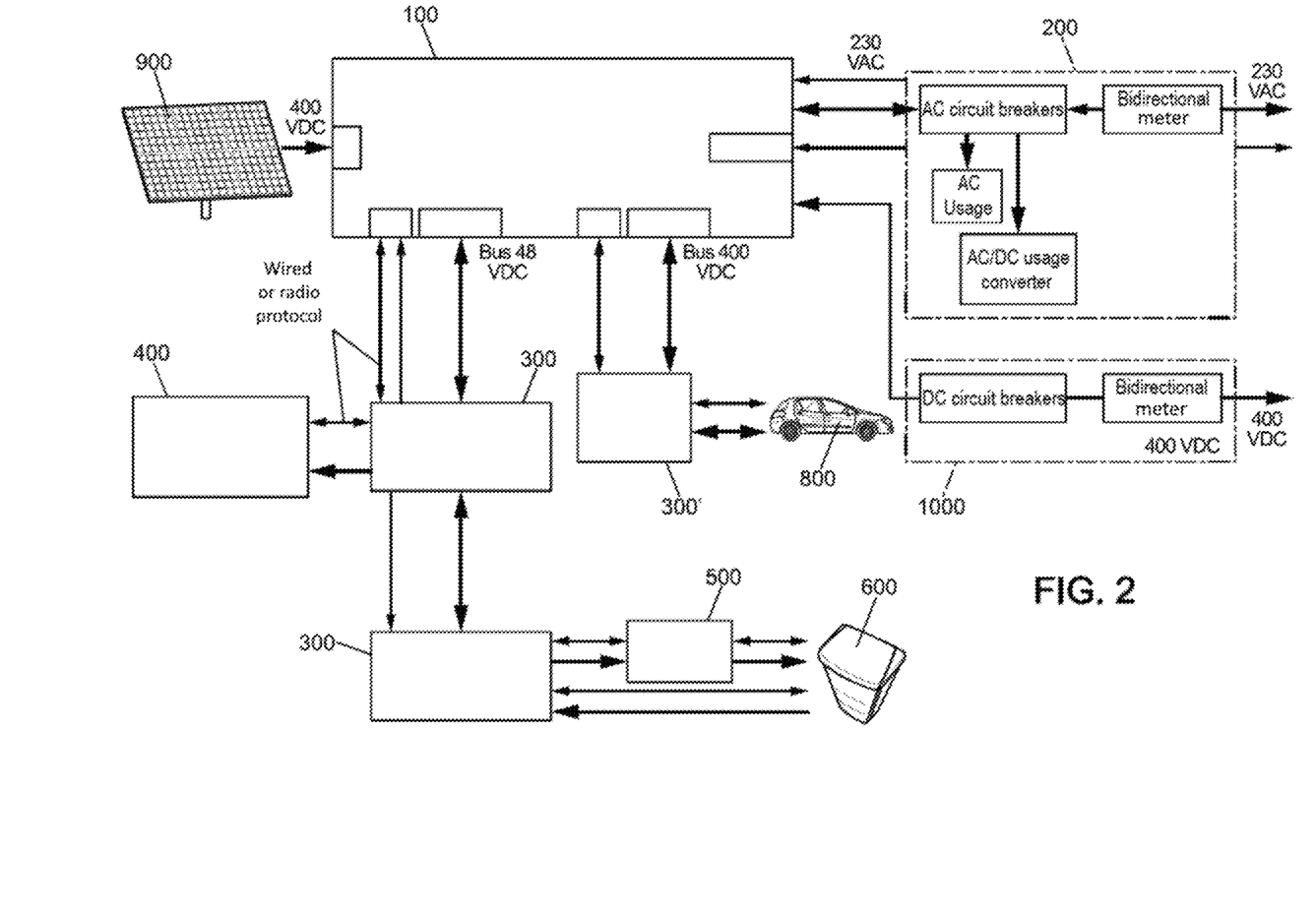
FIG. 2 is similar to FIG. 1 and also shows the details of some of the structural elements.

In FIGS. 1 and 2, a single private network 1, here a residential network, is shown. The private network 1 comprises a coordination unit 100, or central block. The coordination unit 100 is coupled to a respective node located at the interface of at least one general network and the private network 1. In the example described here, two general networks are shown: an alternating current (AC) general network 200, for example 230 volts, and a direct current (DC) general network 1000, for example 400 volts. Each of the general networks 200, 1000 is connected to a plurality of private networks, possibly similar to the one shown in FIG. 1, via a similar coordination unit.

The AC general network 200 generally takes the form of a conventional distribution network and makes it possible to connect the AC powered devices to one another. DC powered devices, usually those with electronic components, are trending towards represent an increasingly large portion. They include LED lighting ("LED" for "light-emitting diode"), multimedia devices or "brown goods", and recent appliances or "white goods". In addition, the devices for generating and storing energy such as solar panels and batteries generally operate in direct current. Devices connected to a DC network do not each need to be equipped with AC/DC converters. The electrical energy can remain in the form of direct current from the source all the way to the consumer device. The number of AC/DC conversions between the generator and the consuming device can be reduced, which improves energy efficiency.

The coordination unit 100 here comprises two inputs 101 and 117, one connected to the AC general network 200 and the other connected to the DC general network 1000. Here the term "input" is used in a context where the private network 1 is considered to be "downstream" from the general distribution networks 200, 1000. However, energy can be injected into one or both of the general networks 200, 1000 from the private network 1. Therefore, the term "input" does not limit the direction of the flow of energy.

Each of the inputs 101, 117 is equipped with converters which are able, if needed, to switch from direct current to alternating current or vice versa and adapt the voltage.

The private network 1 further comprises a plurality of functional groups 400, 401, 500, 800, 900 of at least one electrical device. Each group is connected to the node, here to the coordination unit 100, via a corresponding line in the private network 1. The electrical devices can be divided into groups according to the uses and/or according to the type of energy used by the devices (AC/DC and/or operating voltage for example). The division of the devices into groups can at least partially follow the distributions usually established for electrical protection. Thus, an existing facility, residential for example, can be made to conform to the system proposed here while using the existing lines, reducing the need for physically rewiring.

The coordination unit 100 comprises one output per functional group 400, 401, 500, 800, 900, organized here into two sets of outputs 102 and 102'. A first set 102 is connected to lines supplying devices that operate, for example, at voltages less than or equal to 48 volts DC. A second set 102' is connected to lines supplying devices that operate, for example, at voltages less than or equal to 400 volts DC.

The coordination unit 100 comprises a specific output 103. The output 103 is connected, via a dedicated line, to one or more devices capable of generating electrical energy, here a set of solar panels 900. The output 103 is equipped with converters adapted to the type of energy supplied by the energy generating devices, here a DC/DC voltage converter. The private network 1 may further comprise at least one AC line, for example a conventional power outlet line.

The private network 1 is further equipped with a plurality of relays 300, each arranged on a respective line of the private network 1. Each of the relays 300 is able to communicate with the coordination unit 100.

The relays 300 may have various forms and locations. For example, when the line comprises a single device, the relay 300 may be composed of a single module physically integrated into the electrical device. The single module may also be separate from the device, connected downstream in the line, inserted between the fixed line and the power socket of the device. When several devices are fed via a common line, the relay 300 may comprise a plurality of satellite modules each integrated into an electrical device, and a central module centralizing the information of the satellite modules. The central module or the single module of the relay 300 may be arranged upstream in the line, for example near the coordination unit 100 and/or in an electrical panel of the private network 1.

Figure 3:
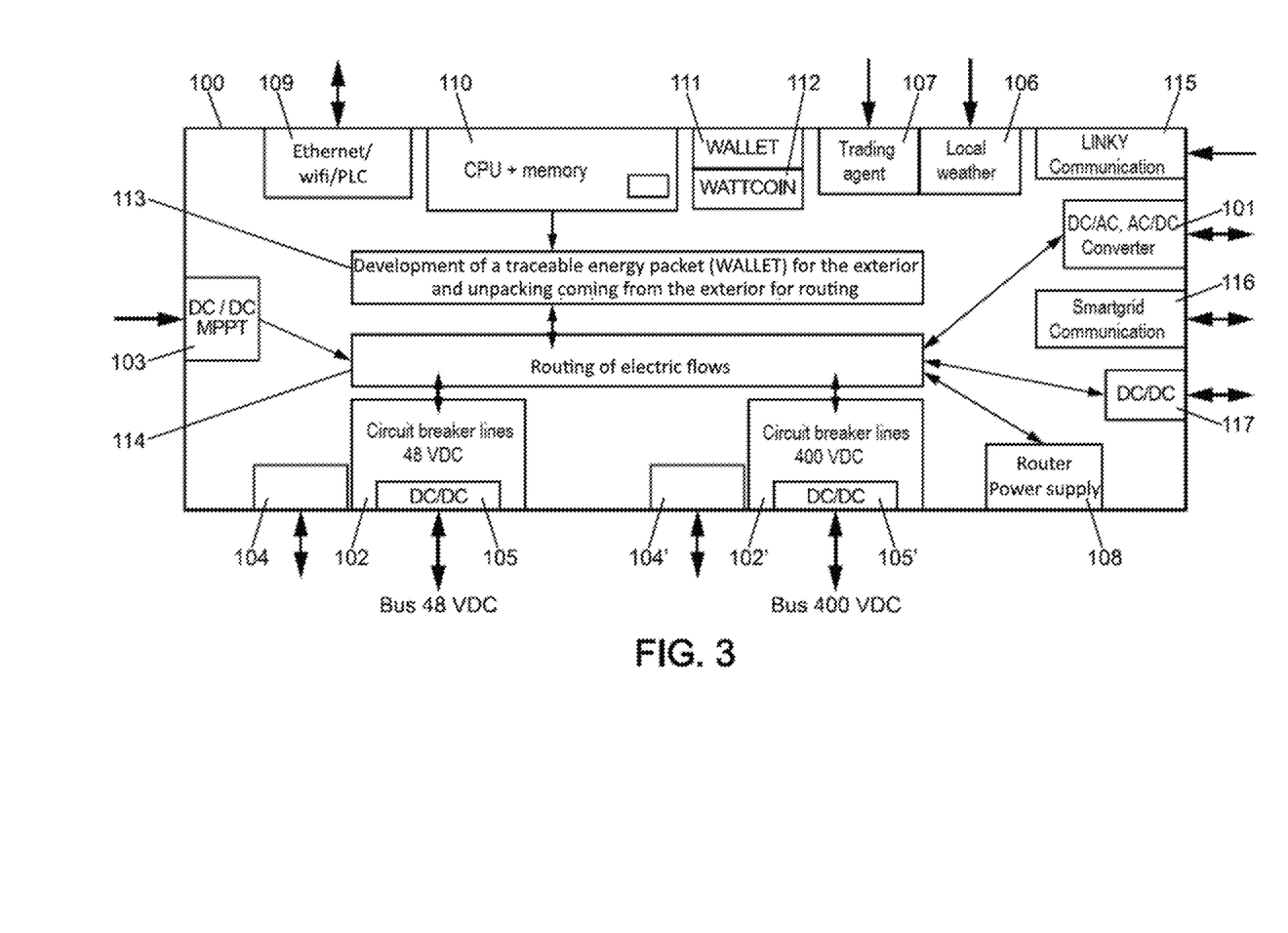
FIG. 3 shows a detailed diagram of one structural element.

Reference is now made to FIG. 3. The coordination unit 100 comprises communication means 104, 104' able to communicate with the relays 300. The converters of each of the outputs 102 and 102' are respectively denoted 105 and 105'.

The coordination unit 100 comprises a power supply 108. The power supply 108 is preferably equipped with a means of emergency backup energy storage such as a battery or batteries, so that in case of power failure via one and/or the other of the general networks 200, 1000, the coordination unit 100 continues to receive power and to operate. In normal operation, the power supply 108 is able to recharge by drawing energy from one of the general networks 200, 1000 and/or generation means 900 and/or storage means 600, 800 of the private network, previously converted by one of the converters if necessary.

The coordination unit 100 comprises communication means 109 capable of transmitting information and/or receiving command instructions from a remote device, for example a smart phone or home automation system. In this case, the remote device must be identified and paired to the system, for example by having obtained a digital certificate.

The coordination unit 100 comprises at least one processor 110, or one set of processors, arranged to implement the functions of each agent described hereinafter with reference to FIG. 6. The coordination unit 100 has access to a memory. The memory may take the form of a local or remote storage unit.

In the embodiments described herein, the coordination unit 100 further comprises an interface 115 with communicating electric meters, for example the "Linky" type meters in France. Through this interface 115, the coordination unit 100 has access to a point of delivery (PDL) number identifying the node by which the private network 1 is connected to the general network(s) 200, 1000. This number is usually called NMP (for Network Measurement Point), when only one meter is needed to measure the consumption and output of a private network. This number can be used by a certifying agent 111, described below, to establish a certificate for the source of an energy packet issued from the private network 1.

The coordination unit 100 comprises communication means 116 for communicating with an exchange platform external to the private network 1 and with the other private networks, through which the private networks transmit information.

Figure 4:
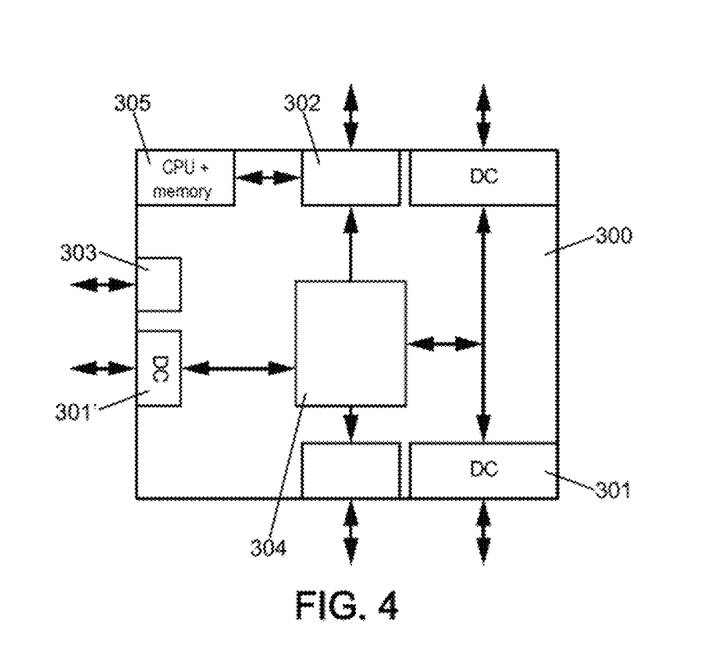
FIG. 4 shows a detailed diagram of one structural element.

Reference is now made to FIG. 4, showing the details of one embodiment of a relay 300. The relay 300 is here combined with a splitter. A splitter takes the form of a module plugged into an electrical panel in the private network 1 and providing power and electrical protection for several lines at the same time via a power bus. Such splitters are described in FR 2 936 662, in FR 2 936 663 or in FR 2 958 812. Such splitters make it possible to share a group of wires, for example a phase-neutral pair: such a group can alternatively carry direct or alternating current, from upstream to downstream or from downstream to upstream. The use of splitters in this system eliminates having to add new cables in existing installations and reduces the number of cables in new installations. The cost of raw material, especially copper, is reduced.

Here, the relay 300 comprises at least two bus outputs 301 and 301', each connected to a group of devices via a line in the private network 1. The relay 300 comprises communication means 302 for communicating with the coordination unit 100, here via the communication means 104, 104' of the coordination unit 100. The protection module, specific to the splitter, is denoted 304. The relay 300 comprises a processor 305, or a set of processors, capable of transmitting the information between the coordination unit 100 and the devices via respective communication means 302 and 303.

A charger 500, a storage battery 600, and an electric vehicle incorporating its own electric charger 800 are specific electrical uses. They are able to notify the coordination unit 100 of the charge levels, and of available amounts of energy storage, via the relay 300.

The relay 300 is capable of withdrawing energy from downstream of the protection module 304, coming from the power bus 301, once it has received authorization from the coordination unit 100, for a priority level and a fixed period. The energy is supplied to the device associated with the relay 300 downstream of the bus output 301', from the device arranged downstream of the output 301.

Electrical power distribution buses equipping the outputs 105, 105' of the coordination unit 100, here in direct current of 48 volts or 400 volts, allow for simultaneously:
- delivering energy to the charger 500 or to the charger incorporated in the electric vehicle 800 via the respective relays 300 as soon as the coordination unit 100 authorizes the withdrawal via the protection module 304, and
- drawing from the stored energy in order to inject it, via the power buses, into the general networks 200, 1000.

The relays 300 can be configured and updated via the coordination unit 100 and the communication means 302.

Figure 5:
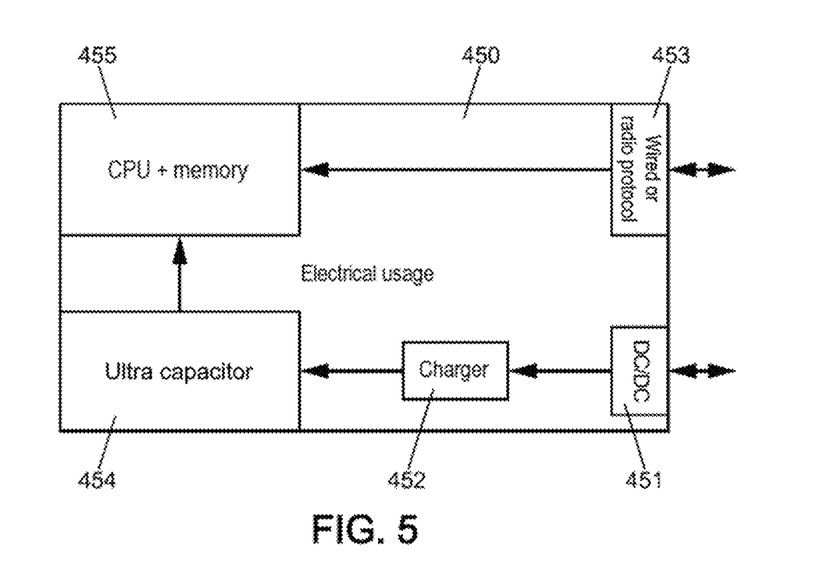
FIG. 5 shows a detailed diagram of one structural element.

Reference is now made to FIG. 5 representing a satellite module 450 complementary to the relay 300. The satellite module 450 is integrated into an electrical device or connected between the electrical device and the line supplying the power. The satellite module 450 comprises an input 451, here equipped with a voltage converter. The input 451 receives the energy transmitted via the output 301' of the relay 300. The input 451 is connected to a charger 452, itself connected to an ultra-capacitor 454. The charger 452 and the ultra-capacitor 454 here make it possible to store a portion of the energy received. The stored energy may for example be used to maintain the device, or more precisely the satellite module 450, in a so-called "standby" mode during which the device is able to communicate with the coordination unit 100 via the relay 300. Thus, even in the absence of sufficient power for the device to perform its main function, it is still able to transmit and receive data. The ultra-capacitor 454 therefore allows the satellite module 450 to access a minimum amount of energy for it to wake and request the necessary energy for its activity via computer programs stored and executed by the processor 305. Alternatively, the ultra-capacitor 454 is charged by another device which allows harvesting energy from its environment ("energy harvesting").

The satellite module 450 comprises communication means 453 compatible with the communication means 303 of the relay 300 so as to be able to transmit information in both directions. The satellite module 450 comprises a processor 455, or a set of processors, powered by the ultra-capacitor 454 and able to establish status data for the device.

The relay 300 and each satellite module 450 exchange information via a bidirectional data stream (wired or radio) in order to request energy for a fixed period of time and at a given priority level, upstream or downstream of the relay 300.

During operation, the communication network established between the satellite module 450, the relay 300, and the coordination unit 100 enables:
- communicating via a bidirectional stream with the coordination unit 100 which manages the energy of the private network 1 via the satellite module 450;
- receiving control commands from the coordination unit 100 via the satellite module 450;
- pairing the electrical device with the system in order to be able to locate it, and to know its energy requirements and its priority level as recorded in the memory accessible to the coordination unit 100;
- configuring and updating the satellite module 450.

Figure 6:
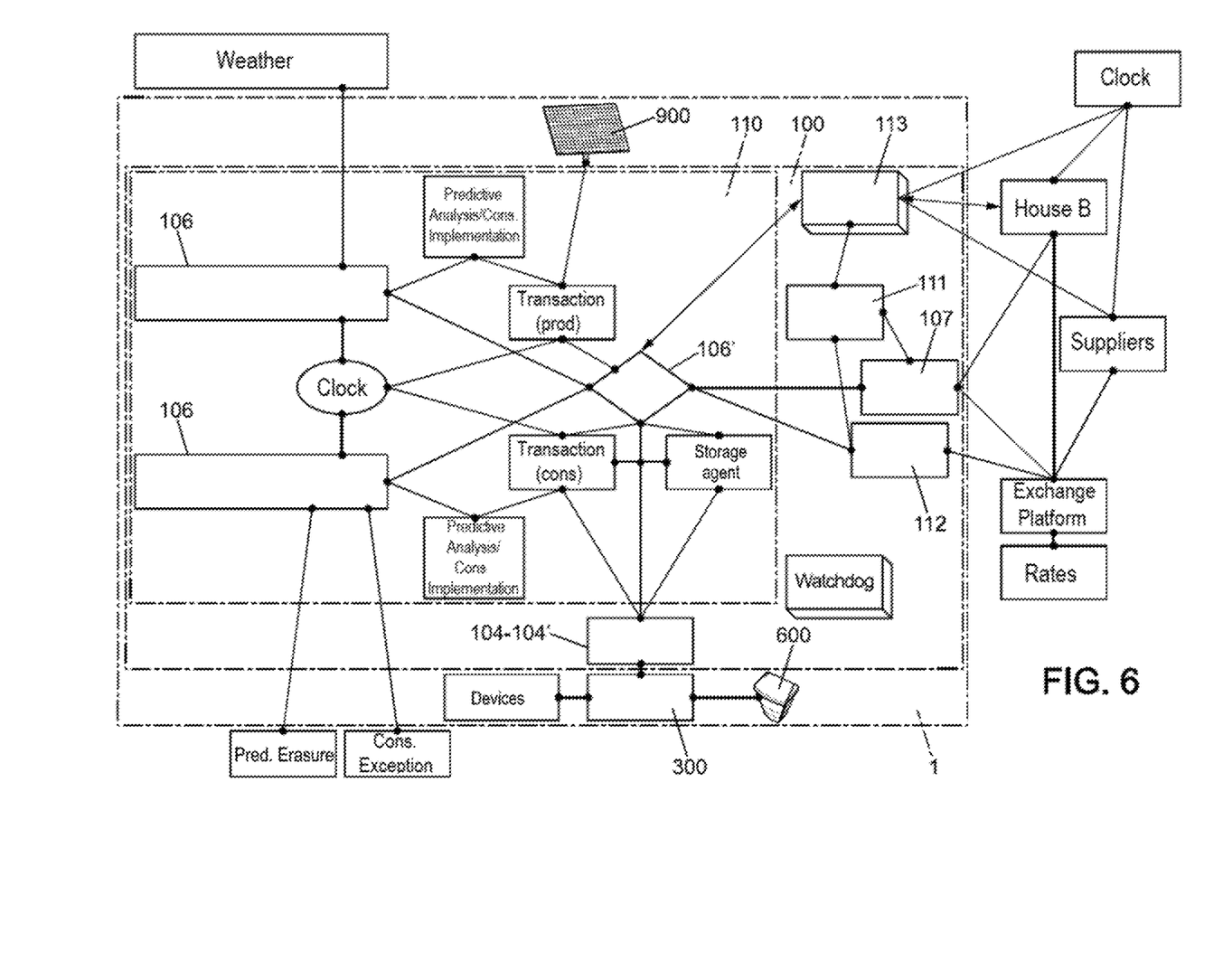
FIG. 6 shows a block diagram of one embodiment of the coordination unit.

Reference is now made to FIG. 6. The coordination unit 100 can be viewed as artificial intelligence (AI). The coordination unit 100 coordinates a multi-agent system (MAS), with each agent or module being partially autonomous. The MAS can be viewed as a combination of several technologies:

artificial intelligence for the decision-making aspects of each agent;

distributed artificial intelligence for distributing the execution;

distributed systems for the interactions between agents;

software components for increasing the autonomy of agents relative to each other;

communicating objects for the optionally remote aspect of the component elements of the system.

In the example described here, the coordination unit 100 comprises the following agents:

- a learning and forecasting agent 106 that records the energy requirements of the consumer devices and their usage cycles, the energy generation of the generating devices over time, and the charge levels of the energy storage devices. The learning and forecasting agent 106 also receives meteorological information in order to predict the resources and requirements based on prior resources and requirements according to climatic variations in particular. For example, a future temperature drop allows anticipating additional energy requirements for heating systems while a future sunny period allows anticipating energy resources from solar panels 900. The history and predictions of energy requirements and resources of each group of devices are stored in memory accessible to the learning and forecasting agent 106.
- a decision and management agent 106' for requirements and resources which, based on the predictions of the learning and forecasting agent 106, instructs a trading agent 107 whether to acquire or dispose of energy, whether or not to store energy, and whether or not the electrical devices should consume energy directly in the private network 1. The learning and forecasting agent 106 can thus arbitrate based on the resources of the private network 1, its reserves, the rates in force, and the knowledge it has learned concerning the amount of energy required for the private network 1, but also based on the concept of energy source, especially if it meets predefined ecological criteria. This last concept is important. Today there is a market for offers to purchase green energy, but the current consumed at a given moment does not provide any information about its source. Admittedly, a method can be implemented such as the blockchain technology as applied to the energy domain, to validate the fact that a producer is providing a consumer with renewable energy but the current is missing the labeling aspect at the moment it is used that guarantees that there is indeed a match between the current produced in one place and the current consumed in another.
- at the request of the decision and management agent 106', the trading agent 107 predicts and searches for amounts of energy to be sold or acquired over time on an exchange platform external to the private network 1. The trading agent 107 applies predefined criteria for selecting amounts of energy, particularly in terms of rates and energy type. The exchange platform is common to a set of private networks connected to at least one of the general networks 200, 1000. The trading agent 107 forms the interface between the coordination unit 100 of the private network 1 and the external exchange platform.
- a transaction agent, not shown, connects an electrical device requesting energy with a device providing energy, and keeps record of the energy exchanges for a billing agent 112.
- an analysis agent for analyzing predictions and actuals allows enriching the learning and forecasting agent 106.
- the certifying agent 111 is arranged to establish a unique identifier or certificate for each energy packet to be transmitted, and to recognize an identifier associated with each energy packet received. The certifying agent 111 is synchronized with the certifying agents of other coordination units so that each identifier is unique and recognized by each of the certifying agents. The certifying agent makes it possible to ensure the traceability of each energy packet for which an identifier is established. Certificates here are called "WALLET".
- the billing agent 112 records the exchanges of the private network 1 with each of the other private networks, so that accounts are kept in real or virtual currency (for example a currency specific to all the private interconnected networks). The exchanges can therefore be carried out peer-to-peer.
- an energy packet analysis and creation agent 113. The energy packet analysis and creation agent 113 links each energy packet to the certificate issued by the certifying agent.

The formation of part of a digital encryption key in order to create the digital certificate takes into account, for example in France, the number of the electricity Point of DeLivery (PDL) of the residence, via the interface 115 as described above.

The exchange of data, particularly certificates, between two private networks (one the supplier, the other the consumer) can be done "peer-to-peer". A virtual private network called a "VPN tunnel" can be established. Each exchanged data packet is encrypted by the VPN client according to an algorithm decided by the two parties when establishing the tunnel and may possibly be signed.

The certificate may take the form of an identifier, or code. In the case of a DC packet from the private network 1, injected into the general network 1000 and intended for another private network, such an identifier can be physically associated with the flow of electrical energy. For example, the flow of electrical energy may comprise a complementary part which comprises delivery identification data for identification of the delivery via the network, a complementary part in which the electrical power is amplitude modulated, the complementary part thus having periods during which the electrical power is lower than the constant level of the main part of the flow.

Similarly, the energy packet analysis and creation agent 113 reads and recognizes the identifiers associated with the energy packets available on the general network 1000 in order to recognize the energy packets that are the objects of a transaction in order to take them from the general network 1000.

The certificates contribute to the traceability of energy.

The coordination unit 100 further comprises a "Watchdog" type subsystem which allows monitoring all the tasks or agents in order to avoid any risk of blockage.

The interactions between the elements described so far will now be described in a operational context of the system, and in the form of a method for exchanging electrical energy between a plurality of private networks connected to each other via at least one general electricity distribution network, here two distribution networks 200 and 1000 of which one 1000 is DC.

Each of the relays 300 transmits status data for the devices of the group corresponding to the relay 300, to the coordination unit 100. The status data can be described here as upload data, transmitted from the downstream lines to the coordination unit 100 upstream. The status data are defined here by the processor 405, transmitted from the satellite module 450 to the relay 300 via the communication means 303, 403, then transmitted to the coordination unit 100 via the communication means 104, 104', and 302. For example, the status data comprise a demand for power, or request, or no demand from the device. The request from the device may comprise, for example, a total desired amount of energy, a desired amount of energy per unit of time (instantaneous power), a usage, a desired date (in other words energy requirements for instantaneous or deferred startup of the devices), a priority index which depends on the instantaneous or deferred nature of the requirement, or a combination of such criteria. Status data may also come from devices able to store and/or generate electrical energy, for example the set of solar panels 109. The status data may then include an amount of energy produced per unit of time in real time, a charge level of the storage devices, and/or information relating to the amount of stored energy available.

The processor 110 of the coordination unit 100, in particular the learning and forecasting agent 106, collects all the data transmitted by the relays 300. Then, a set of internal electrical energy resources and requirements of the private network 1 is established by the decision and management agent 106', based on the received status data.

In the example described here, the learning and forecasting agent 106 first establishes a predictive model of the electrical energy resources or requirements for each functional group as a function of time and received status data. The predictive model is refined based on data related to the status data, such as meteorological data. Alternatively, an analysis agent for analyzing predictions and actuals may further enrich the forecasts of the learning and forecasting agent 106 by correcting predictions based on discrepancies between past predictions and past actual requirements/resources (this is referred to as learning). The decision and management agent 106' then establishes future resources and requirements based on the refined and corrected predictive model stored in the memory for each group of devices and for each time period. Resources and requirements for each use, in other words for each group of devices, are established as a function of time.

The set of internal resources and requirements are compared with each other and with external resources and requirements, in other words those from other private networks.

In the example described here, the set of internal resources and requirements of the private network 1 are first compared with each other. In other words, it can be considered a priority rule to match the requirements of the private network 1 with the resources of the private network 1 when possible. Giving preference to the energy independence of the private network 1 is thus considered a priority. In this case, the decision and management agent 106' allocates an internal resource to each internal requirement when it detects a match, without going through the trading agent 107. For example, a DC resource available at time t and coming from the solar panels 900 can be allocated to a DC requirement at the same time t of a group of devices in the private network 1.

For the requirements and resources that could not be allocated internally, the decision and management agent 106' instructs the trading agent 107 to compare the internal requirements and resources with the external requirements and resources on the exchange platform. The exchange platform here has access to a public pricing database in order to set energy prices, for example according to its type (local or not, green or not).

The trading agent 107 issues offers on the platform to acquire and/or supply energy according to the requirements and resources of the private network 1. Depending on the rates, the trading agent 107 decides whether to acquire or supply energy, store or not store energy, consume or not consume energy directly by the electrical devices in the private network 1.

Thus, an internal or external resource is allocated to each internal requirement, and an internal or external requirement is allocated to each internal resource, depending on the results of the comparison. In cases where a comparison does not find a match between a resource or requirement of the private network 1 with a respective requirement or resource of another private network, then one of the general networks 200, 1000 is assigned to it by default.

The coordination unit 100 carries out at least some of the routing of the electrical energies according to the allocations. The routing may be performed by means of an energy flow router 114, for example as described in WO2014147437.

Routing comprises:
issuing a digital certificate for each internal resource injected into the general network,
identifying the source of the external resources drawn via the general network, using digital certificates, and
communicating instructions for the drawing of electrical energy on the private network 1, to the relays 300.

The digital certificate is created here by the certifying agent 111, while it is issued by the energy packet analysis and creation agent 113.

The energy packet analysis and creation agent 113 is a processing and analysis module that determines whether the electric current flowing through the coordination unit 100, from or to the private network 1, is unprocessed current (alternating or continuous), in other words devoid of a digital certificate or of energy packets with associated certificates.

For example, the destination being one of the general networks 200, 1000: From the solar panels 900, the locally generated current is optionally converted to direct current at a nominal voltage by means of the converter 103. The energy at this stage is therefore pure direct current (or unprocessed energy unassociated with a certificate). The energy packet analysis and creation agent 113 knows the exact source of the electric current. Therefore, the energy packet analysis and creation agent 113 can create a certificate comprising, for example, information such as "green energy". Information identifying the source and/or the recipient may also be included in the certificate. The energy is then labeled "green energy". In the case of a default allocation to the DC general network 1000, the current can be injected into the DC general network 1000 without being assigned a certificate, optionally converted by the converter 117.

The current can also be inserted into the AC general network 200 by being converted beforehand by the converter 101. In the case of a default allocation to the AC general network 200, the current can be injected into the AC general network 200 without being assigned a certificate. In the case of an allocation to another private network 1, the current can be injected into the AC general network 200 with a certificate. Such a certificate can also, for example, implement a "blockchain" type technology to validate the exchanges between the two private networks.

For example, coming from one of the general networks 200, 1000:

Coming from the AC general network 200, the alternating current is converted into direct current by means of the converter 101. When no certificate is associated with the energy, the current is then unprocessed direct current. The energy packet analysis and creation agent 113 does not recognize a well-defined source (local or national district, for example) and therefore by default assigns "anonymous" or "red" labeling (as opposed to green energy).

Coming from the DC general network 1000, the DC is converted to DC by means of the converter 117. This current may be unprocessed, in which case the treatment is similar to the case above. This current may also include a complementary part comprising delivery identification data and in which the electrical power is amplitude modulated as described above. In this case, the energy packet analysis and creation agent 113 analyzes the information attached to the energy packets, recognizes the exact source of the electric current (generated in the local district for example), and optionally whether it is "green energy".

By identifying the energy resource received, it can then be allocated to the device group that was the origin of the request allocated to the resource. This allocation takes the form of a transmission of instructions for drawing electrical energy on the private network 1, to the corresponding relays 300.

When an energy resource is injected into one of the general networks 200, 1000 or when an energy resource is received from one of the general networks 200, 1000, each energy exchange can be entered in the records in order to define a transaction between two private networks. Such entry is done here by the billing agent 112.

The routing of electrical energy in the private network 1 makes it possible to distribute the energy required by each of the groups of devices via the lines by controlling, over time, the energy drawn via the relays 300, and optionally the satellite modules 400. The time-based organization of the various withdrawals via a given line is based on the priority and the amount required for each electrical use. The bidirectional communications between the coordination unit 100 and each of the relays 300 makes it possible to use the same line or a shared line portion to transport various types of electric energy over time. For example, this allows:
- a supply of direct electrical current carried by an existing bus of "N pairs of cables" delivering a voltage typically of 48V and/or 400V downstream of the DC/DC converters 105, 105' coming from the router 114 and going to a plurality of relays 300, 300' and associated electrical devices;
- a supply of direct electrical current carried by the same existing bus of "N pairs of cables", where the number of pairs of assisting cables can be less than or equal to N, delivering a voltage typically of 48V and/or 400V, coming from the energy storage battery 600 and/or electric vehicle 800 and going to a plurality of relays 300, 300' and associated electrical devices.

This also makes it possible to create an "energy streaming" device by the following exemplary scheme:
- an electrical device requests energy;
- the processor 110 of the coordination unit 100 recognizes the signature of the electrical device, has already learned its consumption cycles, has already anticipated its future demand, and has earmarked and begun to store a portion of this energy;
- the processor 110 authorizes the electrical device, via the relay 300 and a distributor or via several cascading distributors, to draw its energy directly from the battery 600 via the DC power bus 102;
- during this time, the processor 110 continues to set aside the energy required for this device and to store it, for example via the charger 500 and other lines of the same distributors.

Once the energy transfers have been made, the financial transactions take place via the billing agent 112. Here, the virtual currency used is called "WATTCOIN". The selling of energy allows each private network to obtain WATTCOINs, which in turn can be used for buying energy, electrical usage time, or for example time for charging an electric vehicle in the neighborhood.

By means of the communication means 109, a remote site or platform is able to update the intelligence of the coordination unit 100, comprising:
- an operating system implemented by the processor 110,
- the agents of the coordination unit 100,
- the communication protocols of the communication means 109, 115, 116, 104, 104,
- new services, stored in the memory of the coordination unit 100, using for example WALLET and WATTCOIN, or using data coming from the communication means 104, 104', The remote site or platform is also able to receive the electrical metering records of the general networks 200, 1000 by means of the interface 115.

The remote platform is also able to collect statistical and transaction data provided by each coordination unit 100 in order to develop services, offers, or cost accounting.

The system according to the disclosure has been described in the operational state, suitable for implementing a method according to the disclosure. The system can also take the form of a kit for installing the system, for example on an existing electrical structure. For example, such a kit comprises:
- a first device able to be connected to a private network 1 so as to form a coordination unit 100, and/or
- at least one second device able to be connected to a line of a private network 1 so as to form a relay 300.

In addition, a computer program in accordance with the disclosure comprises instructions for implementing a method as described above when this program is executed by a processor.

The disclosure is not limited to the exemplary methods, systems, kits and programs which are described above only as examples, but encompasses all the variants conceivable to those skilled in the art within the scope of the claims below.

The following features may optionally be implemented:
- a private network comprises at least one functional group for generating electrical energy and/or at least one functional group for storing electrical energy;
- the private network comprises a functional group for storing electrical energy, the status data of the functional group comprising load level information and/or information relating to an available amount of stored energy;
- at least one general network comprises an AC network and a DC network;
- some of the status data of the devices comprise requirements for instantaneous or delayed startup of said devices and/or a priority index that is dependent on the instantaneous or deferred nature of the requirements;
- the coordination unit comprises a forecasting agent and an access to a data storage memory, the method further comprising the establishing of a predictive model of the electrical energy resources or requirements of a functional group by the forecasting module according to the received status data, the set of resources and requirements being established on the basis of the predictive model stored in the memory;

the coordination unit is equipped with a learning module and with access to a data storage means on which is stored a predictive model of the electrical energy resources or requirements of a functional group as a function of time, the method further comprising the updating of the predictive model by the learning module, based on the received status data, the set of resources and requirements being established on the basis of the updated predictive model;

the predictive model is established and/or updated on the basis of the status data specific to each functional group, meteorological data, and pricing data;

the coordination unit is equipped with an exchange module and with access to an exchange platform common to a plurality of the private networks, the comparison of the internal resources and requirements with the external resources and requirements being carried out via the exchange module on said commercial platform;

the requirements and resources comprise:
  data relating to the amount of electrical energy,
and at least one of the following
  data relating to the location of the electrical energy source, and
  data relating to the type of electrical energy production;

each digital certificate comprises an identifier of the node through which the electrical energy is injected into the general network; and the relays further comprise protection means capable of electrically isolating the group of devices from the node in the event of an electrical fault, such that the relays replace the protection devices when installing the system on an existing electrical structure.

The invention claimed is:

1. A method for exchanging electrical energy between a plurality of private electricity networks connected to each other via at least one general electricity distribution network, each private network comprising:
  a coordination unit coupled to a respective node located at the interface of the general network and the private network,
  functional groups of at least one electrical device, each group being connected to the node via a corresponding line of the private network, and
  a plurality of relays, each relay being arranged on a line,
the method comprising, for each private network:
  a) transmitting, from each of the relays to the coordination unit, status data for the at least one electrical device of the corresponding group,
  b) establishing a set of electrical energy resources and requirements internal to the private network, based on the status data,
  c) comparing the set of internal resources and requirements with each other and with the external resources and requirements of the other private networks,
  d) allocating an internal or external resource to each internal requirement, and an internal or external requirement to each internal resource, according to the results of the comparison,
  e) ensuring at least part of the routing of electrical energy according to the allocations, this ensuring of the routing including:
    e1) issuing a digital certificate for each internal resource injected into the general network,
    e2) identifying the source of the external resources drawn via the general network, by means of the digital certificates, and
    e3) transmitting instructions for drawing electrical energy on the private network, to the relays,
  f) keeping record of each energy exchange in order to define a transaction between two private networks.

2. The method according to claim 1, wherein a private network comprises at least one functional group for generating electrical energy and/or at least one functional group for storing electrical energy.

3. The method according to claim 2, wherein a private network comprises a functional group for storing electrical energy, the status data of the functional group comprising load level information and/or information relating to an available amount of stored energy.

4. The method according to claim 1, wherein the at least one general network comprises an alternating current network and a direct current network.

5. The method according to claim 1, wherein at least one of the private networks comprises at least one alternating current line and at least one direct current line.

6. The method according to claim 1, wherein some of the status data of the devices comprise requirements for an instantaneous or deferred startup of said devices and/or a priority index that is dependent on the instantaneous or deferred nature of the requirements.

7. The method according to claim 1, wherein the coordination unit comprises a forecasting agent and an access to a data storage memory, the method further comprising:
  a') the establishing of a predictive model of the electrical energy resources or requirements of a functional group by the forecasting module according to the received status data, the set of resources and requirements being established on the basis of the predictive model stored in the memory.

8. The method according to claim 1, wherein the coordination unit is equipped with a learning module and with access to a data storage means on which is stored a predictive model of the electrical energy resources or requirements of a functional group as a function of time, the method further comprising:
  a") updating of the predictive model by the learning module, based on the received status data, the set of resources and requirements being established on the basis of the updated predictive model.

9. The method according to claim 7, wherein the predictive model is established and/or updated on the basis of the status data specific to each functional group, meteorological data, and pricing data.

10. The method according to claim 1, wherein the coordination unit is equipped with an exchange module and with access to an exchange platform common to a plurality of the private networks, the comparison of the internal resources and requirements with the external resources and requirements being carried out via the exchange module on said exchange platform.

11. The method according to claim 1, wherein the requirements and resources comprise:
  data relating to the amount of electrical energy,
and at least one of the following:
  data relating to the location of the electrical energy source, and
  data relating to the type of electrical energy production.

12. The method according to claim 1, wherein each digital certificate comprises an identifier of the node through which the electrical energy is injected into the general network.

13. An electric energy exchange system comprising a plurality of private electrical networks connected to each other via at least one general electricity distribution network, each private network comprising:
- a coordination unit coupled to a respective node located at the interface of the general network and the private network,
- functional groups of at least one electrical device, each group being connected to the node via a corresponding line of the private network, and
- a plurality of relays, each relay being arranged on a line, each relay being arranged for:
- a) transmitting, from each of the relays to the coordination unit, status data for the at least one electrical device of the corresponding group, each coordination unit being arranged for:
- b) establishing a set of electrical energy resources and requirements internal to the private network, based on the status data,
- c) comparing the set of internal resources and requirements with each other and with the external resources and requirements of the other private networks,
- d) allocating an internal or external resource to each internal requirement, and an internal or external requirement to each internal resource, according to the results of the comparison,
- e) ensuring at least part of the routing of electrical energy according to the allocations, this ensuring of the routing including:
  - e1) issuing a digital certificate for each internal resource injected into the general network,
  - e2) identifying the source of the external resources drawn via the general network, by means of the digital certificates, and
  - e3) transmitting instructions for drawing electrical energy on the private network, to the relays,
- f) keeping record of each energy exchange in order to define a transaction between two private networks.

14. The system according to claim 13, wherein the relays further comprise protection means capable of electrically isolating the group of devices from the node in the event of an electrical fault, such that the relays replace the protection devices when installing the system on an existing electrical structure.

15. A kit for installing the system according to claim 13, comprising:
- a first device able to be connected to a private network so as to form a coordination unit, and/or
- at least one second device able to be connected to a line of a private network so as to form a relay.

16. A non-transitory computer-readable storage medium having stored thereon computer-executable instructions for carrying out the method of claim 1.

* * * * *